United States Patent [19]

Her

[11] Patent Number: 5,712,911

[45] Date of Patent: Jan. 27, 1998

[54] METHOD AND SYSTEM FOR AUTOMATICALLY ACTIVATING AND DEACTIVATING A SPEAKERPHONE

[75] Inventor: Ju-Won Her, Gumi, Rep. of Korea

[73] Assignee: SamSung Electronics Co. Ltd., Suwon, Rep. of Korea

[21] Appl. No.: 527,561

[22] Filed: Sep. 13, 1995

[30] Foreign Application Priority Data

Sep. 16, 1994 [KR] Rep. of Korea ............... 23622/1994

[51] Int. Cl.$^6$ ............................................ H04M 1/64
[52] U.S. Cl. .................. 379/420; 379/201; 379/375; 379/377; 379/418
[58] Field of Search ............................. 379/201, 211, 379/210, 418, 420, 63, 388, 389, 252, 375, 377

[56] References Cited

U.S. PATENT DOCUMENTS

| | | |
|---|---|---|
| 3,109,893 | 11/1963 | Burns . |
| 3,250,172 | 5/1966 | Abbott, Jr. et al. . |
| 4,568,800 | 2/1986 | Orikasa ................................ 379/63 |
| 4,659,876 | 4/1987 | Sullivan et al. ...................... 379/420 |
| 4,893,071 | 1/1990 | Miller . |
| 4,932,050 | 6/1990 | Davidson et al. ................... 379/201 |
| 5,010,566 | 4/1991 | Seo . |
| 5,224,151 | 6/1993 | Bowen et al. . |
| 5,337,353 | 8/1994 | Boie et al. . |

FOREIGN PATENT DOCUMENTS

541439-A1  12/1993  European Pat. Off. .

*Primary Examiner*—Krista Zele
*Assistant Examiner*—Scott Wolinsky
*Attorney, Agent, or Firm*—Robert E. Bushnell, Esq.

[57] ABSTRACT

A novel telephone system and method for activating a speakerphone in response to an incoming call based upon the presence or absence of a subscriber within a predetermined proximity zone. The telephone system has a ring detector for detecting a ring signal in response to an incoming call received via a central switching network, a proximity sensor for sensing the presence or absence of a subscriber within a predetermined proximity zone of the telephone system, and a control unit for automatically activating the speakerphone to establish communication with the caller when the subscriber is within the predetermined proximity zone and deactivating the speakerphone in response to detecting a busy tone generated by the central switching network when the call is terminated.

20 Claims, 2 Drawing Sheets

METHOD AND SYSTEM FOR AUTOMATICALLY ACTIVATING AND DEACTIVATING A SPEAKERPHONE

CROSS-REFERENCE TO RELATED APPLICATIONS

This application makes reference to, incorporates the same herein, and claims all benefits accruing under 35 U.S.C. §119 from an application for *Telephone Apparatus For Automatically Forming Speech Path Of Speakerphone And Control Method Therefor* earlier filed in the Korean Industrial Property Office on 16 Sep. 1994 and assigned Ser. No. 23622/1994.

BACKGROUND OF THE INVENTION

1. Technical Field

The present invention relates to telephone communication systems, and more particularly to telephone communication systems having a speakerphone and a proximity sensor for sensing the presence or absence of a subscriber within a predetermined proximity zone, and for automatically activating the speakerphone in response to an incoming call to allow the subscriber to engage in conversation with a caller when the subscriber is within the predetermined proximity zone and for automatically deactivating the speakerphone upon termination of the conversation.

2. Background Art

Generally, most telephone communication systems today are provided with an additional speakerphone feature in which communication can be alternately established between subscribers via microphone and speaker installed therein without using either a conventional handset or a cordless handset. The speakerphone however requires manual operation from the subscriber. For example, when an incoming call (ring) is received from a central switching system, the subscriber must pick up the handset to establish communication with the caller, and then he/she must manually press a speakerphone button on the base unit if he/she wants to engage in conversation with the caller via speakerphone. This manual requirement is often burdensome and undesirable.

More recent conventional telephone systems are provided with hand-free speakerphone features that would form a speech path in response to an incoming call. These systems however form the speech path often unnecessarily regardless whether the subscriber is present or absent in his/her room or office. Consequently, the caller has to wait for the subscriber to respond to the call unnecessarily, and the speech path is needlessly formed by the telephone systems.

Known techniques to automatically establish communication via speakerphone are disclosed, for example, in U.S. Pat. No. 5,224,151 for *Automatic Handset-Speakerphone Switching Arrangement For Portable Communication Device* issued to Bowen et al., and U.S. Pat. No. 5,337,353 for *Capacitive Proximity Sensors* issued to Boie et al. In Bowen '151, proximity sensors are used in conjunction with cordless telephone communication systems for sensing the distance between a handset and a subscriber's car so as to allow the subscriber to either operate the telephone as a cordless handset when the subscriber places the handset close to the car, or to operate the telephone as a speakerphone when the subscriber places the handset away from the car. Hence, communication is automatically established via speakerphone without requiring the subscriber to manually press the speakerphone button whenever he/she places the handset away from the car. Similarly, Boie '353 also discloses proximity sensors used for sensing the distance between a handset and a subscriber's head so as to allow the subscriber to operate the telephone as a speakerphone when the subscriber places the handset away from the head in conventional telephone systems.

Proximity sensors disclosed by both Bowen '151 and Boie '353 are widely used in many communication applications. For example, in U.S. Pat. No. 3,109,893 for *Proximity Operated Loudspeaking Telephone* issued to Burns, proximity switches are used for turning the telephone on when the subscriber passes his hand near the sensor to establish communication with the caller, and turning off the telephone when the subscriber again passes his hand near the sensor to terminate communication with the caller. U.S. Pat. No. 4,932,050 for *Proximity Detection For Telecommunication Features* issued to Davidson et al., also uses proximity sensors in conjunction with an integrate services digital network ISDN switching system for sensing the presence or absence of a subscriber within a predetermined proximity zone so as to forward an incoming call directly to the subscriber when the subscriber is in the proximity zone, or to a call processing program responding to the caller with a special announcement or a display of the number to which the incoming call is forwarded when the subscriber is not in the proximity zone. In European Patent No. 541439 for *Auditory Communication Device Such As Ticket Counter Intercom Uses Proximity Detector To Activate Microphone When Speaker Is Present Within Predetermined Proximity Zone* issued to Rihiant, proximity sensors are also used for sensing the presence or absence of a subscriber within a predetermined proximity zone so as to automatically turn on the ticket counter. In the above systems, however, I have observed that they do not utilize speakerphone in a telephone system effectively and do not allow the subscriber to communicate via speakerphone automatically upon reception of an incoming call without requiring the subscriber to manually press the speakerphone button on the base unit.

SUMMARY OF THE INVENTION

Accordingly, it is therefore an object of the present invention to provide a telephone system including a proximity sensor for effectively and automatically activating a speakerphone in a telephone system in response to an incoming call to allow a subscriber to engage in conversation with a caller via speakerphone when the subscriber is present within the predetermined proximity zone and for automatically deactivating the speakerphone upon completion of the conversation.

It is also an object of the present invention to provide a telephone system including speakerphone that bypasses the use of a manually operated push speakerphone button when responding to an incoming call via speakerphone.

It is another object of the present invention to provide a novel telephone system including a speakerphone and a proximity sensor for sensing the presence and absence of a subscriber within a predetermined proximity zone, and for automatically activating the speakerphone in response to an incoming call to allow the subscriber to engage in conversation with a caller when the subscriber is present within the predetermined proximity zone and for automatically deactivating the speakerphone upon termination of the conversation.

To achieve the above and other objectives, the present invention contemplates a telephone system including a line interface unit "LIU" electrically interfaced with telephone line for forming a direct current loop in response to a line control signal; a ring detector for detecting a ring signal in response of an incoming call received via telephone line; a tone detector for detecting a busy tone upon termination of communication with a caller; a speakerphone circuit connected to LIU for establishing communication via speakerphone comprising microphone and loudspeaker; a proximity sensor for sensing the presence or absence of a subscriber within a predetermined proximity zone of the telephone system and generating a human body sensing signal after sensing the presence or absence of the subscriber, a microprocessor "MPU" for allowing the subscriber to automatically establish communication with the caller via speakerphone when an incoming call is received by the ring detector via telephone line and the subscriber is sensed by the proximity sensor, and for deactivating speakerphone when busy tone is received by the tone detector indicating that communication has been terminated; a display control unit interfaced with MPU for providing the subscriber's control information to MPU, and for providing a visual display of information outputted from MPU.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
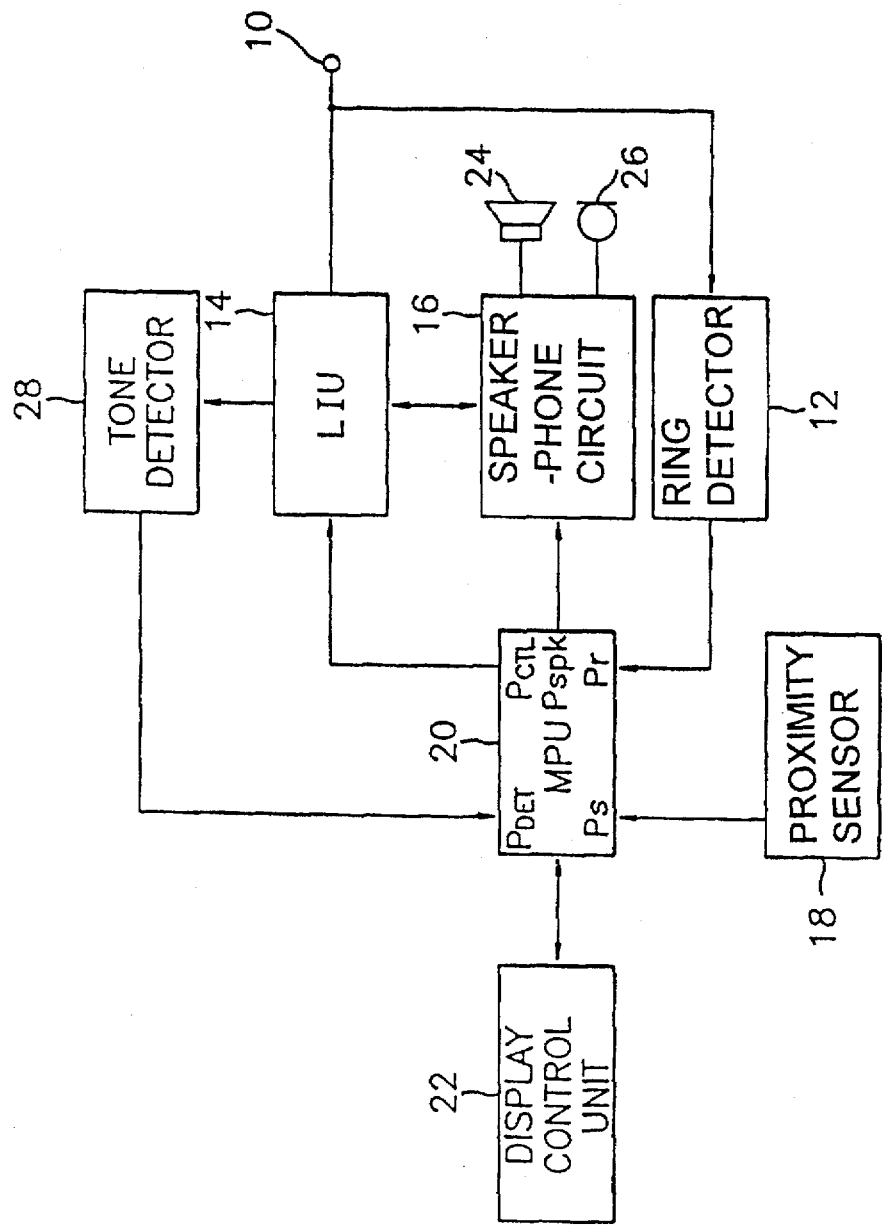
FIG. 1 is a block diagram illustrating a telephone system for automatically forming a speech path as constructed according to the principles of the present invention.

Turning now to the drawings and particularly to FIG. 1 which illustrates a telephone system for automatically forming a speech path with a speakerphone as constructed according to the principles of the present invention. The telephone system as contemplated by the present invention includes a line interface unit (hereinafter, referred to as LIU) 14 electrically interfaced with a telephone line 10 connected to a central switching network for forming a direct current loop in response to a line control signal, a ring detector 12 for detecting a ring signal in response to an incoming call signal received via telephone line 10, a tone detector 28 for detecting a busy tone upon termination of communication with a caller, a speakerphone circuit 16 connected to LIU 14 for establishing communication via speakerphone comprising microphone 26 and loudspeaker 24, a proximity sensor 18 for sensing the presence or absence of a subscriber within a predetermined proximity zone of the telephone system and generating a human body sensing signal after sensing the presence or absence of the subscriber, a microprocessor unit (hereinafter, referred to as "MPU") 20 for allowing the subscriber to automatically establish communication with the caller via speakerphone when an incoming call is received by the ring detector 12 via telephone line 10 and the subscriber is sensed by the proximity sensor 18 and for deactivating speakerphone when busy tone is received by the tone detector 28 indicating that communication has been terminated, a display control unit 22 interfaced with MPU 20 for providing the subscriber's control information to MPU 20 and for providing a visual display of information outputted from MPU 20.

MPU 20 as constructed according to the principles of the present invention is programmed to respond to an output of the ring detector 12 representative of an incoming call via telephone line 10, and then monitor the proximity sensor 18 to determine whether the subscriber is present within the predetermined proximity zone so as to enable the speakerphone circuit 16 to automatically establish a speech path i.e., communication with the caller via speakerphone. Accordingly, it may be apparent to one skilled in the art that if the subscriber is making an outgoing call to another subscriber via the central switching network, communication would not automatically be established via speakerphone but would be established via normal handset. However, should communication via speakerphone be desirable for outgoing calls, the MPU 20 may be constructed to accommodate such desirable request.

Proximity sensor 18 as constructed according to the principles of the present invention can be pyroelectric IR (infrared) type of sensors for sensing infrared radiation from the human body to determine whether the subscriber is present or absent within the predetermined proximity zone. Commercially available infrared sensors may be used to sense the presence or absence of the subscriber in the predetermined proximity zone. These infrared sensors may sense the presence of the subscriber not only based upon his/her body heat, but also based upon motion. Consequently, there will predictably be time when the infrared sensors will falsely sense the presence of an unintended person who happens to be in the proximity zone for a short time. Accordingly, to avoid inappropriate action when someone enters the proximity zone only temporarily, infrared sensor is preferably followed a timing circuit that requires the infrared sensor to maintain an "on" or "off" state for a predetermined period before the infrared sensor generates an output that indicates whether the subscriber is validly present or absent within the proximity zone.

Moreover, the telephone system as constructed by the principles of the present invention may also include mechanism such as, for example, a manually operated "on" and "off" button connected either to the MPU 20 or the proximity sensor 18 that allows the subscriber to optionally turn the proximity sensor 18 "on" in operation or "off" from operation for all future reception of incoming calls.

Figure 2:
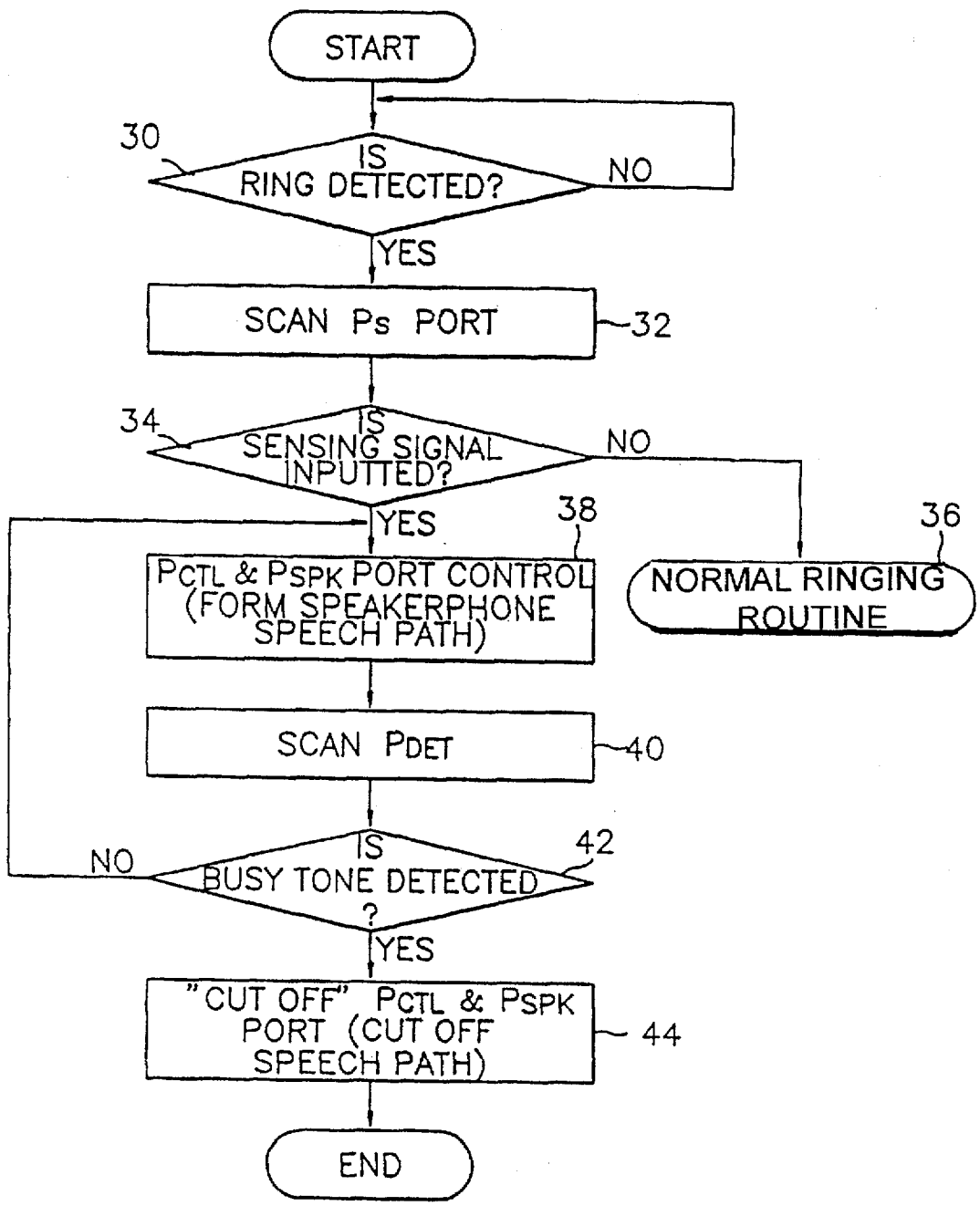
FIG. 2 is a flow chart illustrating an automatic speech path forming process according to the principles of the present invention.

FIG. 2 is a flow chart illustrating an automatic speech path forming process according to the principles of the present invention, in which the process is programmed in a read only memory (ROM) stored in MPU 20 shown in FIG. 1.

The operation of the telephone system shown in FIG. 1 according to the present invention will now be described with reference to FIG. 2. When the telephone system constructed as shown in FIG. 1 begins its operation, MPU 20 detects whether a ring signal is input via port (Pr) from the ring detector 12 in step 30 as shown in FIG. 2. If no ring signal is detected at port (Pr), MPU 20 determines that there is no incoming call from the telephone line 10, and repeats step 30 until an incoming call is received. That is, the MPU 20 sequentially scans port (Pr) for an output of the ring detecting circuit 12 for an incoming call.

If, on the other hand, the ring signal is received via the telephone line 10 representing an incoming call from the outside, the ring detector 12 detects the ring signal and then outputs a ring detecting signal to port ($P_r$) of the MPU 20. At this time, MPU 20 determines that the ring signal is detected in step 30, and then scans port ($P_s$) in step 32 to detect whether a human body (subscriber) sensing signal is inputted at port ($P_s$) in step 34. Here, the human body sensing signal generated by the proximity sensor 18 indicates that the subscriber is present within the proximity zone of the telephone system. If the sensing signal is not inputted via port (Ps), MPU 20 executes normal ringing routine in step 36. That is, when the subscriber is absent from the proximity zone such as, for example, his/her office, MPU 20 controls a bell driving circuit comprising a ringer (not shown) to generate ringing tone to loudly alert the subscriber of an incoming call.

When the subscriber hears the ringing tone and approaches the telephone system to answer the incoming call, the proximity sensor 18 senses that the subscriber is present within the proximity zone and thereby generates the human body sensing signal to port ($P_s$) of the MPU 20. At that moment, after determining that the body sensing signal is input at port ($P_s$), the MPU 20 generates a speakerphone control signal at ports ($P_{CTL}$) and ($P_{SPK}$) in step 38 for enabling the speakerphone circuit 16 to automatically form a speech path with the speakerphone. That is, MPU 20 generates the control signal exhibiting a logic "high" level to ports ($P_{CTL}$) and ($P_{SPK}$) in order to form the speech path in the speakerphone.

LIU 14 then forms a direct current loop with telephone line 10 when the telephone is hook off in response to the control signal exhibiting the logic "high" level outputted from port ($P_{CTL}$) of the MPU 20, and thereby establishing communication with the caller via speakerphone circuit 16. Thus, telephone line 10 is connected to the speakerphone circuit 16 and the ring signal is then cut off.

Speakerphone circuit 16 reproduces and amplifies the speech signal received from the LIU 14 in response to the control signal exhibiting the logic "high" level outputted from port ($P_{SPK}$) of the MPU 20, and then generates the reproduced and amplified speech signal to speaker 24. Then, the speakerphone circuit 16 sends the speech signal from microphone 26 through LIU 14 to the telephone line 10. Therefore, speakerphone circuit 16 operates microphone 26 and loudspeaker 24 as a speakerphone under the control of the MPU 20, and thus allowing the subscriber to directly and automatically communicate with the caller (conversation partner) via speakerphone without requiring the subscriber to manually press the conventional speakerphone button.

In the meantime, MPU 20 sequentially scans port ($P_{DET}$) in step 40 to determine whether a busy tone representing that the conversation has been terminated is detected from the tone detector 28 in step 42. If the busy tone is not detected, MPU 20 returns to step 38 and maintain the speech path through speakerphone. However, when the subscriber finishes the conversation with the caller and hangs up the telephone, or when the caller hangs up the telephone, the busy tone is sent from the central exchange, which is input through telephone line 10 to the tone detector 28. The tone detector 28 detects only the busy tone from all possible signals input through the telephone line 10 so as to generate a busy tone to the MPU 20.

Accordingly, when the caller first hangs up the telephone, the busy tone signal is input to port ($P_{DET}$) of the MPU 20. Then, after determining that the busy tone is detected in step 42 of FIG. 2, the MPU 20 cuts off generation of the control signal to ports ($P_{CTL}$) and ($P_{SPK}$) in step 44, and thereby terminating the speech path via speakerphone. Thus, when either the subscriber or the caller hangs up the telephone after completion of the conversation, the speech path in the speakerphone is automatically deactivated.

Therefore, the novel telephone system according to the principles of the present invention advantageously allows the subscriber to respond to the incoming call via speakerphone automatically without requiring him/her to manually press a speakerphone button. Moreover, them is no need to automatically operate the speakerphone, since the speakerphone operates only in response to an incoming call, even if the proximity sensor 18 continuously senses the presence or absence of the subscriber within the predetermined proximity zone.

As described above, the present invention detects the subscriber in the proximity of the telephone system in response to an incoming call and then automatically forms a speech path with speakerphone to allow the subscriber to engage in conversation with the caller by speakerphone when the subscriber is present in the proximity of the telephone system. If the subscriber is absent from the proximity of the telephone system, the telephone system first generates a normal ringing tone until the subscriber approaches the telephone system to answer the incoming call and then forms the speech path with speakerphone the moment the subscriber is sensed to be present in the proximity of the telephone system. Further, the present invention optimizes the telephone system by automatically cutting off the speech path upon detection of the busy tone.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A telephone system, comprising:

a ring detector for detecting when an incoming call placed by a caller via a central switching network is received at an installation maintained by a subscriber;

a proximity sensor for sensing whether the subscriber is present within a predetermined proximity zone of said installation;

a speakerphone comprising a microphone and a loudspeaker; and controller means for enabling the subscriber to engage in conversation with the caller via said speakerphone when said proximity sensor senses that the subscriber is present within said predetermined proximity zone by automatically activating the speakerphone in response to said incoming call, and for automatically deactivating the speakerphone upon termination of said incoming call.

2. The telephone system as claimed in claim 1, wherein said controller means alerts the subscriber to said incoming call by generating a ringing tone when said proximity sensor senses that the subscriber is not present within said predetermined proximity zone, and when said proximity sensor subsequently senses that the subscriber is present within said predetermined proximity zone during said incoming call, automatically activating the speakerphone and enabling the subscriber to engage in the conversation with the caller via said speakerphone.

3. The telephone system as claimed in claim 1, wherein said proximity sensor comprises an infrared sensor for sensing whether body heat is present within said predetermined proximity zone.

4. The telephone system as claimed in claim 1, wherein said proximity sensor comprises a motion sensor for sensing whether motion is present within said predetermined proximity zone.

5. A telephone system for controlling a speech path between a speakerphone and a telephone line, said telephone system comprising:

ring detector means for detecting a ring signal representing an incoming call from said telephone line;

sensor means for sensing whether a subscriber is in the proximity of said telephone system; and controller means connected to said ring detector means and said proximity sensor means, for responding to said ring signal representing said incoming call to automatically form said speech path between said speakerphone and said telephone line for enabling the subscriber to communicate with a caller of said incoming call via said speakerphone, when said subscriber is sensed to be in the proximity of said telephone system.

6. The telephone system as claimed in claim 5, wherein said controller means controls generation of a ringing tone for alerting the subscriber of said incoming call when said subscriber is not in the proximity of said telephone system, and then forms said speech path between said speakerphone and said telephone line for enabling the subscriber to communicate with the caller of said incoming call via said speakerphone when said subscriber approaches said telephone system to answer said incoming call.

7. The telephone system as claimed in claim 5, wherein said controller means automatically cuts off said speech path between said speakerphone and said telephone line upon termination of said incoming call between the subscriber and the caller.

8. The telephone system as claimed in claim 5, wherein said sensor means is an infrared sensor for sensing infrared radiation from a human body to determine whether the subscriber is in the proximity of said telephone system.

9. A telephone system for controlling a speech path between a speakerphone and a telephone line, said telephone system comprising:

ring detector means for detecting a ring signal representing an incoming call from said telephone line;

tone detector means for detecting a busy tone input from said telephone line;

sensor means for sensing whether a subscriber is in the proximity of said telephone system; and controller means operatively connected to said ring detector means, said tone detector means, and said sensor means, for automatically forming said speech path between said speakerphone and said telephone line in response to detection of said ring signal representing said incoming call when the subscriber is sensed to be in the proximity of said telephone system, and for cutting off said speech path in response to detection of said busy tone.

10. The telephone system as claimed in claim 9, wherein said controller means controls generation of a ringing tone for alerting the subscriber of said incoming call when said subscriber is not in the proximity of said telephone system, and forms said speech path between said speakerphone and said telephone line for enabling the subscriber to communicate with the caller of said incoming call via said speakerphone when said subscriber approaches said telephone system to answer said incoming call.

11. The telephone system as claimed in claim 9, wherein said sensor means comprises an infrared sensor for sensing whether body heat is present in the proximity of said telephone system.

12. The telephone system as claimed in claim 9, wherein said sensor means comprises an infrared sensor for sensing whether motion is present in the proximity of said telephone system.

13. A method for controlling a speakerphone in a telephone system comprising a ring detector, a proximity sensor, a speakerphone comprising a microphone and a loudspeaker, and a controller for controlling operation of said speakerphone, said method comprising:

receiving an incoming call via a telephone line;

sensing whether a subscriber is within a predetermined proximity zone in response to reception of said incoming call;

automatically activating the speakerphone in response to said incoming call to allow the subscriber to engage in a conversation with a caller of said incoming call via said speakerphone when the subscriber is sensed to be within said predetermined proximity zone; and automatically deactivating the speakerphone upon termination of said conversation.

14. The method as claimed in claim 13, further comprising alerting the subscriber of said incoming call by generating a ringing tone when said subscriber is not within said predetermined proximity zone, and when the subscriber enters said predetermined proximity zone to answer the incoming call, automatically activating the speakerphone for enabling the subscriber to engage in the conversation with the caller via said speakerphone.

15. The method as claimed in claim 13, further comprising monitoring for a busy tone from said telephone line for automatically deactivating the speakerphone.

16. A method for controlling a speakerphone in a telephone system having a built-in proximity sensor for sensing whether a subscriber is within a predetermined proximity zone of the telephone system, said method comprising:

determining whether a ring signal indicating an incoming call placed by a caller is detected from a telephone line at an installation maintained by said subscriber;

sensing whether said subscriber is within a predetermined proximity zone of said installation;

when said subscriber is not within said predetermined proximity zone of said installation, generating a ringing tone to audibly alert said subscriber of said incoming call;

when said subscriber is sensed to be within said predetermined proximity zone of said installation, automatically activating operation of said speakerphone to permit said subscriber to verbally communicate with said caller via said speakerphone; and automatically deactivating operation of said speakerphone upon termination of said incoming call.

17. The method of claim 16, further comprising automatically activating operation of said speakerphone to permit said subscriber to verbally communicate with said caller via said speakerphone, when said subscriber enters said predetermined proximity zone to answer the incoming call after said ringing tone to audibly alert said subscriber of said incoming call has been generated within a predetermined time period.

18. The method of claim 16, further comprising monitoring for a busy tone from said telephone line for automatically deactivating said speakerphone.

19. The method of claim 16, wherein said built-in proximity sensor is a motion sensor for sensing whether motion is present within said predetermined proximity zone.

20. The method of claim 16, wherein said built-in proximity sensor is an infrared sensor for sensing whether body heat is present within said predetermined proximity zone.

* * * * *